April 23, 1968 R. F. MILES 3,379,341
TOTE BOX
Filed June 21, 1967 4 Sheets-Sheet 1

INVENTOR/S
ROBERT F. MILES,
BY Melville, Strasser, Foster and Hoffman
ATTORNEYS

April 23, 1968 R. F. MILES 3,379,341
TOTE BOX
Filed June 21, 1967 4 Sheets-Sheet 2

INVENTOR/S
ROBERT F. MILES,

BY *Melville, Strasser, Foster and Hoffman*
ATTORNEYS

April 23, 1968   R. F. MILES   3,379,341
TOTE BOX

Filed June 21, 1967   4 Sheets-Sheet 3

INVENTOR/S
ROBERT F. MILES,

BY *Melville, Strasser, Foster and Hoffman*
ATTORNEYS

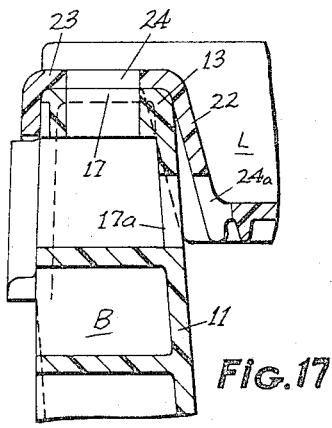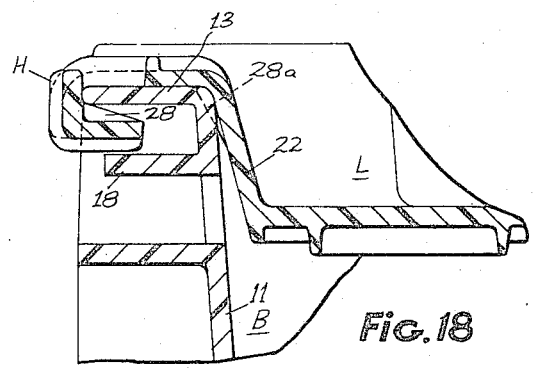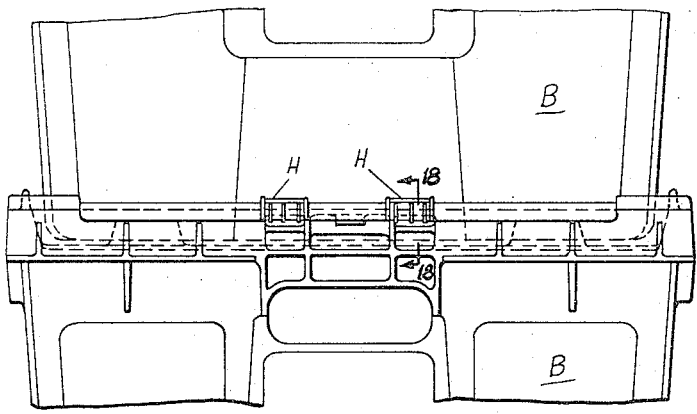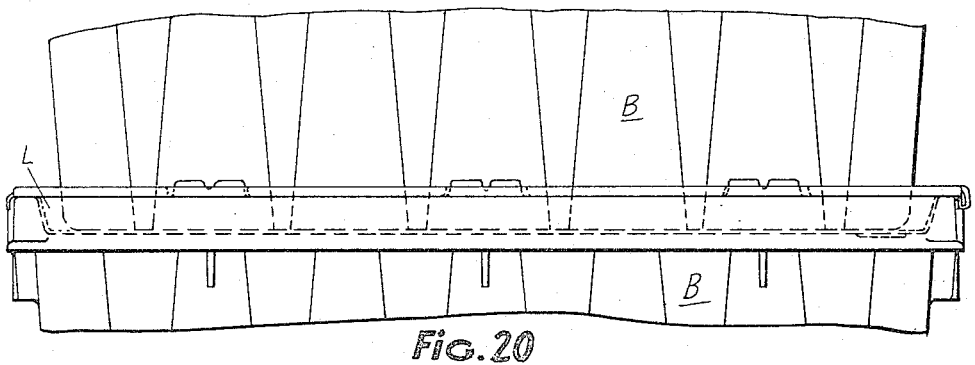

United States Patent Office 3,379,341
Patented Apr. 23, 1968

3,379,341
TOTE BOX
Robert F. Miles, Cincinnati, Ohio, assignor to MS Industries, Inc., Cincinnati, Ohio, a corporation of Ohio
Filed June 21, 1967, Ser. No. 647,665
8 Claims. (Cl. 220—97)

ABSTRACT OF THE DISCLOSURE

A tote box with separate lid which when the lid is removed is nestable in another like tote box without regard to end for end orientation and which when the lid is in place is stackable on another like tote box with its lid in place without regard to end for end orientation, the lid being attachable to the tote box without regard to end for end orientation. An improved arrangement for securing a lid to a box is disclosed.

Cross reference to related applications

The tote box of the present invention is very similar to that disclosed and claimed in the copending application of Robert F. Miles, Ser. No. 604,251, filed Dec. 23, 1966, and entitled "Tote Box," except for the means for securing a lid to a tote box. In ornamental appearance, the box is substantially the same as that disclosed in the copending application for design patent, Ser. No. D. 4,993, filed Dec. 12, 1966.

Background of the invention (I) This invention relates to the field of tote boxes such as are generally used in the loading and transporting of packaged goods from a wholesale establishment or warehouse to a retail store such as a supermarket or the like.

(II) The tote box herein described is in most respects identical to that disclosed in said copending application, Ser. No. 604,251, but it was discovered that even when locked by a sealing means the tongue could be pulled out of the slot because of the flexibility of the material of which the box is made and therefore the present invention is directed to improving the means for securing the lid to the box. The present box and lid exhibit all the advantages of that in the copending application with regard to stacking and nesting without regard to end for end orientation and with regard to the placing of the lid on the box without regard to end for end orientation.

Summary

The tote boxes of the present invention are provided adjacent the top of each end with a pair of outstanding spaced flanges and at both ends with a substantially centrally disposed hole. The lids are provided at one end with a substantially centrally disposed hole which may be aligned with the hole above referred to in either position for end for end orientation. The end of the lid opposite that having said hole is provided with hook-like elements adapted to engage between the spaced outwardly extending flanges on the box and the hook elements are provided with wedge members to insure a tight connection between the lid and the box when the lid is properly placed on the box with the hole in the lid aligned with a hole in the box. A locking device may be passed through the aligned holes to hold the lid in place.

Brief description of the drawings

FIG. 17 is a fragmentary cross sectional view similar to FIGS. 3 and 16 showing the engagement between a lid and a tote box.
FIG. 18 is a view similar to FIG. 17 but taken at the opposite end to show the coaction of the hook elements with the spaced flanges and being thus a combination of FIGS. 9 and 15.
FIG. 19 is a fragmentary end elevational view of a tote box with lid and showing another tote box stacked on top of the lid.
FIG. 20 is a side elevational view of FIG. 19.

Description of the preferred embodiment

As with the tote box of the copending application, this tote box may be made of a suitable plastic but this is not a limitation upon the invention. The box is generally rectangular in horizontal cross section and is provided with side walls, end walls and a bottom. The bottom is smaller than the top so that the side and end walls slope downwardly and inwardly.

Figure 1:
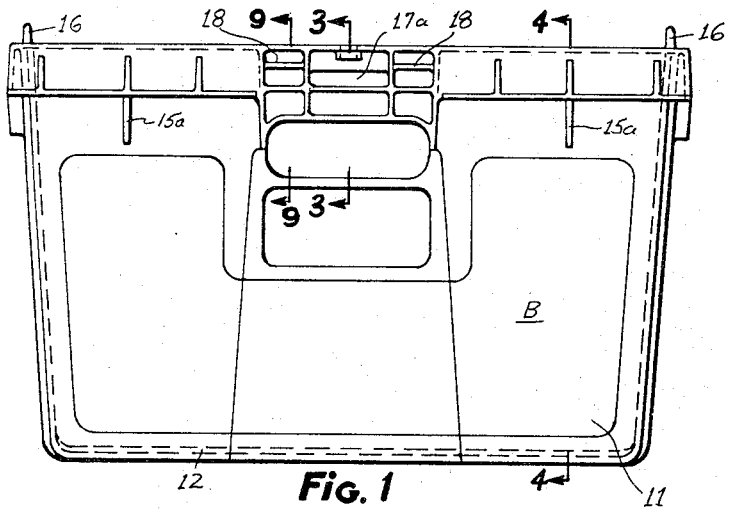
FIG. 1 is an end elevational view of a box according to the present invention.
Figure 3:
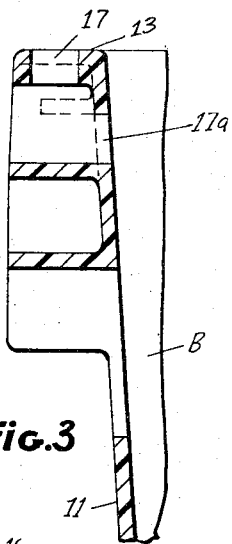
FIG. 3 is a fragmentary cross sectional view on an enlarged scale taken on the line 3—3 of FIG. 1.
Figure 2:
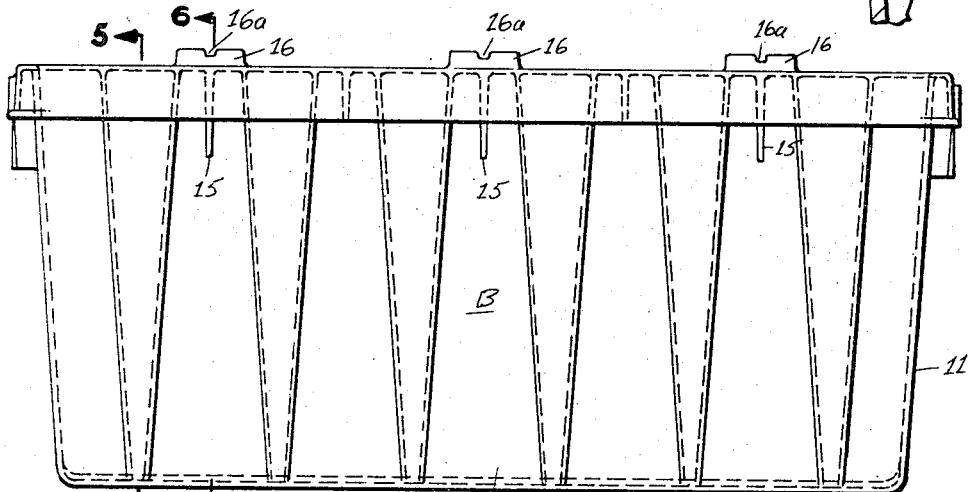
FIG. 2 is a side elevational view of the same.
Figures 4, 5, 6:
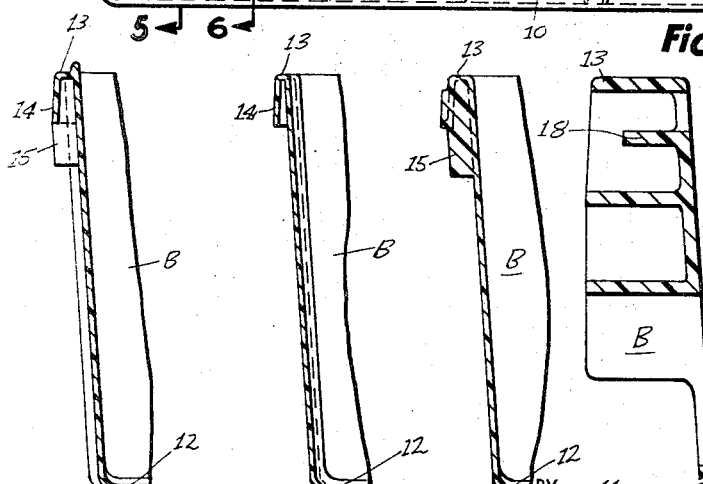
FIG. 4 is a fragmentary cross sectional view taken on the line 4—4 of FIG. 1.
FIGS. 5 and 6 are, respectively, fragmentary cross sectional views taken on the line 5—5 and 6—6 of FIG. 2.
Figure 9:
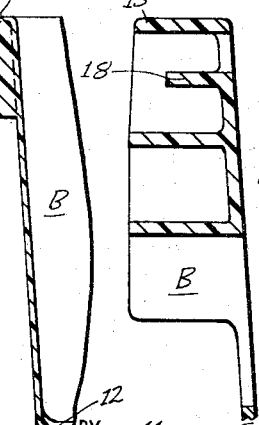
FIG. 9 is a fragmentary cross sectional view on the same scale as that of FIG. 3 taken on the line 9—9 of FIG. 1.
Figure 7:
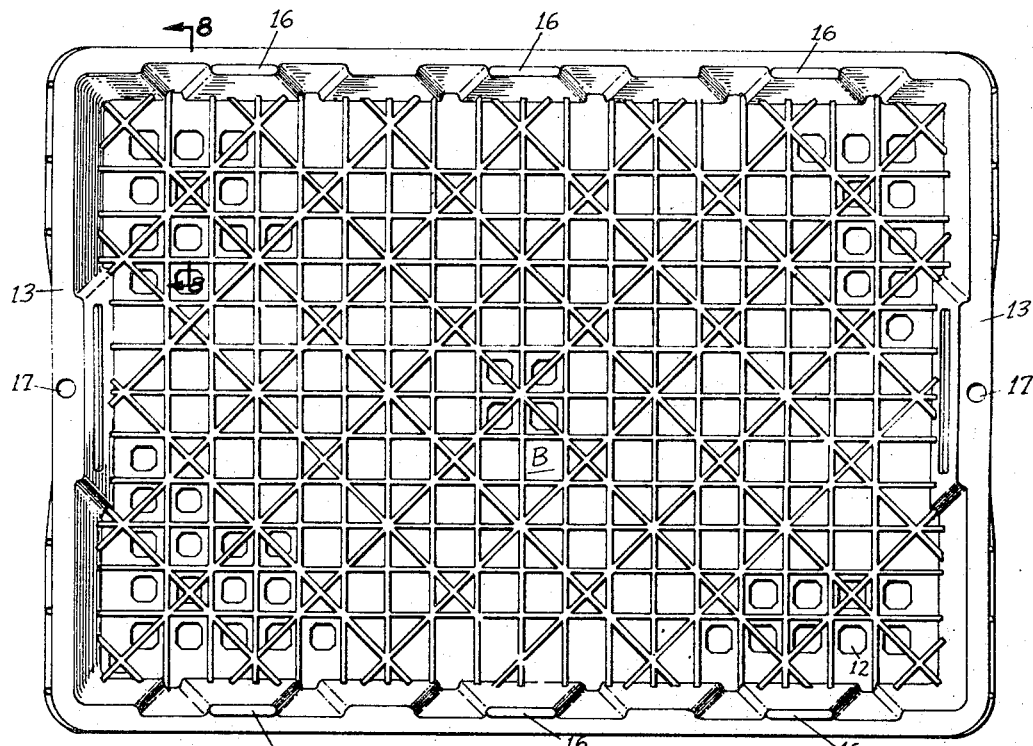
FIG. 7 is a plan view of the tote box.
Figure 10:
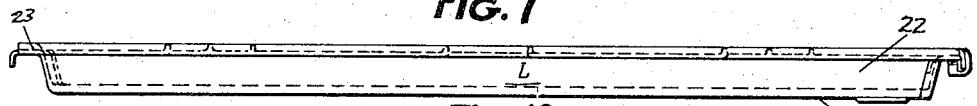
FIG. 10 is a side elevational view of a lid.
Figure 11:
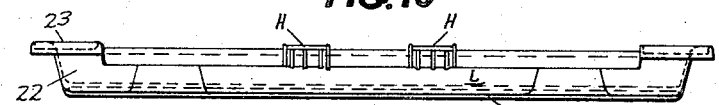
FIG. 11 is an end elevational view of the same as seen from the right of FIG. 10.
Figure 8:
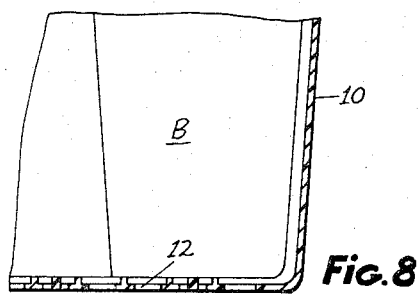
FIG. 8 is a fragmentary cross sectional view taken on the line 8—8 of FIG. 7.
Figure 12:
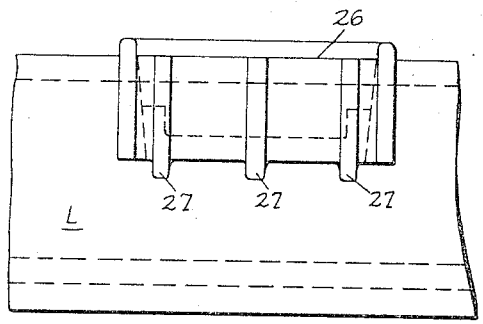
FIG. 12 is a fragmentary end elevational view of a lid seen in the same direction as that in FIG. 11.
Figure 13:
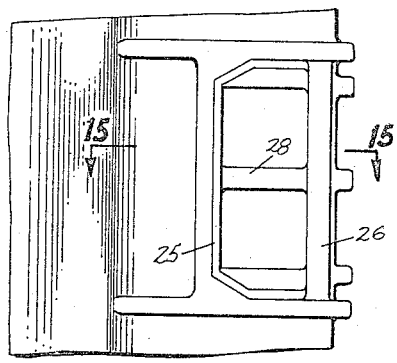
FIG. 13 is a fragmentary plan view of the lid showing one of the hook elements.
Figure 14:
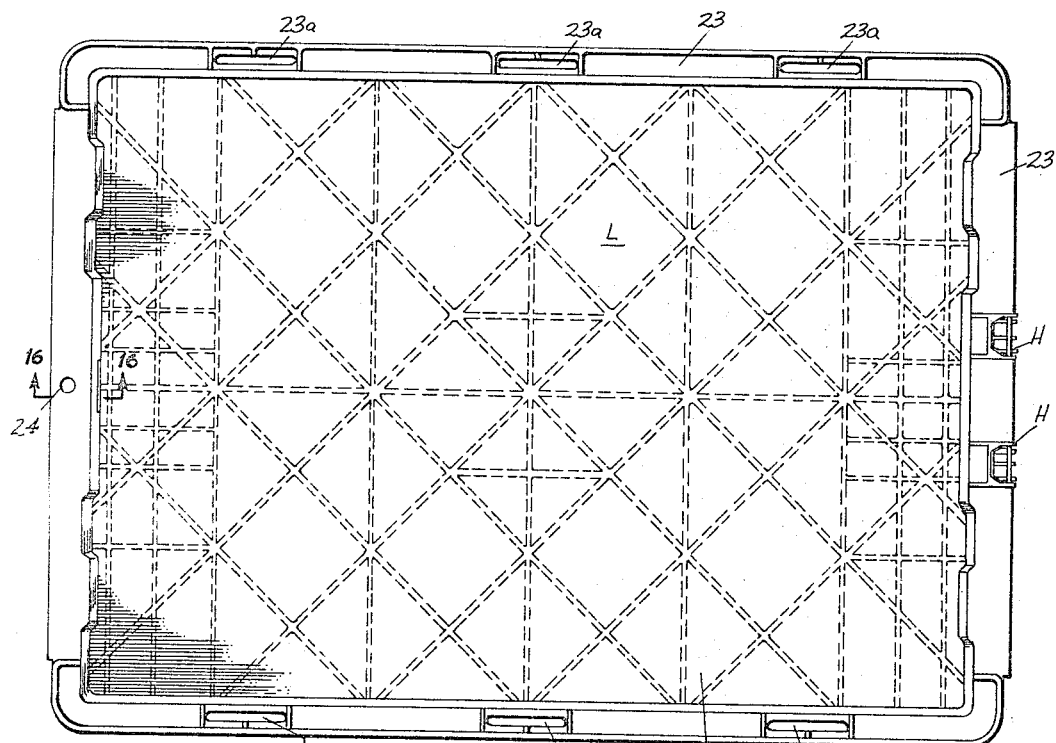
FIG. 14 is a plan view of a lid.

The box is generally indicated at B and has the side walls 10 and the end walls 11. The two side walls 10 are identical. The bottom is indicated at 12 and as shown in FIG. 7 it may have a grid-like construction and may, if desired, be provided with strengthening ribs. The specific structure of the bottom does not constitute a part of the present invention and the solid bottom wall is within the scope of the present invention. The box is provided with a peripheral outwardly extending flange 13 and a downwardly extending flange 14. A plurality of buttress members 15 extend below the flange 14 and these provide limiting stops when one box is nested within another. Extending upwardly from the flange 13 are a plurality of stacking elements 16. These extend along the tops of the two side walls. The stacking elements 16 are provided with notches 16a in which the buttress members 15 of a nested box may engage in the nested position. Thus, when boxes are nested they are prevented from becoming jammed in each other. The buttress members 15a in the end walls are slightly longer than the buttress members 15 and they simply rest on the top flange 13 in nesting. They differ in length from the buttress members 15 by the height of the stacking elements 16.

The flange 13 substantially centrally of each end wall of the tote box is provided with a hole 17 and symmetrically on each side of the center of the end wall are provided the outwardly extending flanges 18. The flanges 18 together with the flange 13 constitute a pair of spaced parallel flanges which ultimately cooperate with the hook elements to be described hereinafter. It will be understood that hand holds and labeling spaces may be provided as is well known in the art. Likewise, portions of the end wall may be pebbled or roughened so as to take chalk marks if desired.

Figures 15, 16:
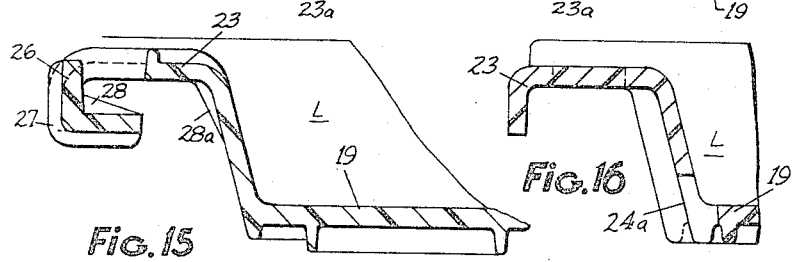
FIG. 15 is a fragmentary cross sectional view on the same scale as FIGS. 12 and 13 and taken on the line 15—15 of FIG. 13.
FIG. 16 is a fragmentary cross sectional view on the same scale as FIG. 15 taken on the line 16—16 of FIG. 14.

The lid member is shown in FIGS. 10 to 16 inclusive. It is generally rectangular and dished. It has a flat surface 19 which may, as is well known in the art, be provided with ribs for strengthening. Extending upwardly from the flat surface 19 is an upwardly directed sloping peripheral flange 22 and an outwardly extending peripheral flange 23. The lid is generally indicated by L. The flange 23 along the two sides of the lid is provided with slots 23a which, when the lid is in place on a box, engage the stacking elements 16. At one end of the lid in the flange 23 is provided a hole 24 which, when the lid is in place, will be aligned with either of the holes 17 of the box. At the other end of the lid two hook elements are provided generally indicated in FIG. 14 at H and shown in more detail in FIGS. 12, 13 and 14. As seen in these figures, the flange 23 is interrupted in two places to provide the open area 25 which is bridged by a strut member 26. This strut member is L-shaped in cross section as best seen in FIG. 15. In the particular embodiment shown, three ridges 27 are formed integral with the strut 26 for strengthening purposes and on the inside of at least the central L-shaped configuration there is provided an integral wedge element 28. As best seen in FIG. 15, an opposed wedge element 28a is also provided to enforce the action of the wedge 28 in gripping the flange 13.

In assembling a lid to a box, the hook elements H of a lid are hooked so that the return portion of the strut 26 and the wedge block 28 enter between the parallel flanges 13 and 18. Then as the opposite end of the lid is brought down so that the flange 22 enters into the box B, the other end of the lid simply rests on top of the flange 13 with the hole 24 aligned with the hole 17, and the wedge 28a ensures that the flange 13 is properly wedged in place. The engagement of the parts is best seen in FIGS. 17 and 18. It will be clear that in the condition of FIG. 17, a lock or a seal may be applied by passing it through the aligned holes 17 and 24 and because of the arrangement of the wedge blocks 28 and 28a, a tight engagement between the lid and the box is assured. It will also be clear that a seal may be applied, if desired, by passing it through the aligned openings 17a in the box and 24a in the lid.

Because the boxes B do not differ in any major respect from those in said copending application, they may be nested within each other in the same manner as there described, regardless of end for end orientation. Likewise, because the two end portions of the box are identical, the hook elements of the lid may be engaged at either end of the box and the holes 24 and 24a may be aligned with either of the holes 17, 17a so that the lid may be applied without regard to end for end orientation.

By virtue of the dished configuration of the lid L, a like box may be seated therein and boxes stacked upon each other as shown in FIGS. 19 and 20. Similarly, the lids by themselves may be nested within each other when not applied to the boxes.

Numerous modifications may be made without departing from the spirit of the invention and therefore no limitation not specifically set forth in the claims should be implied.

The embodiments of the invention in which an exclusive property or privilege is claimed are defined as follows:

1. A tote box of generally rectangular shape in horizontal cross section having side and end walls and a bottom, said box at the top of its opposed side walls having upstanding stacking elements, and adjacent the top of each end wall a pair of vertically spaced outwardly extending flanges, said box being nestable with like boxes, and a lid for said box, said lid being flat and having an upstanding peripheral flange and having a peripheral flange extending outwardly from the upper edge of said upstanding flange, said outwardly extending peripheral flange having slots adapted to mate with said stacking elements, and having at the free edge of the outwardly extending peripheral flange at one end of said lid a downwardly directed flange terminating in an inwardly directed flange, said downwardly and inwardly directed flanges constituting a hook element engageable between said vertically spaced flanges at the top of one of the end walls of said box, said upstanding flange being nestable within said box and said peripheral flange adapted to rest on top of said box, said box being stackable on a like box with lid in place.

2. A tote box according to claim 1, wherein the outwardly extending flange of said lid at the end thereof opposite said hook element is provided with a centrally disposed hole, and an outwardly extending flange at the top of each end wall of said box is also provided with a centrally disposed hole in alignment with the hole in said lid when said lid is in place, whereby when said hook element is engaged with said parallel flanges a locking element may be passed through the aligned holes in said lid and box.

3. A tote box according to claim 2, wherein said inwardly directed flange is provided with a wedge element to insure a tight joint between said hook element and said parallel flanges when said lid is properly nested within said box.

4. A tote box according to claim 3, wherein said inwardly directed flange is provided with two aligned, oppositely directed wedge elements for the purpose described.

5. A tote box according to claim 1, wherein said box is provided with two pairs of vertically spaced outwardly extending flanges symmetrically spaced, one on each side of the center of each end wall, and said lid is provided with two hook elements engageable, respectively, with said two pairs of outwardly extending flanges at the top of one of the end walls of said box.

6. A tote box according to claim 5, wherein the outwardly extending flange of said lid at the end thereof opposite said hook elements is provided with a centrally disposed hole, and an outwardly extending flange at the top of each end wall of said box is also provided with a centrally disposed hole in alignment with the hole in said lid when said lid is in place, whereby when said hook elements are engaged with said parallel flanges, a locking element may be passed through the aligned holes in said lid and box.

7. A tote box according to claim 6, wherein said inwardly directed flanges are provided with a wedge element to insure a tight joint between said hook elements and said parallel flanges when said lid is properly nested within said box.

8. A tote box according to claim 7, wherein said inwardly directed flanges are each provided with two aligned, oppositely directed wedge elements for the purpose described.

References Cited

UNITED STATES PATENTS

| | | | |
|---|---|---|---|
| D. 197,311 | 1/1964 | Spaak | 220—97 X |
| 2,995,269 | 8/1961 | Pease | 220—97 X |
| 3,077,284 | 2/1963 | McLaughlin | 220—97 X |
| 3,331,529 | 7/1967 | Slapnik | 220—97 X |

FOREIGN PATENTS 658,674    3/1963    Canada.

THERON E. CONDON, *Primary Examiner.*

G. E. LOWRANCE, *Assistant Examiner.*